United States Patent [19]

Egner-Walter et al.

[11] Patent Number: 4,598,438

[45] Date of Patent: Jul. 8, 1986

[54] WINDSHIELD WIPER

[75] Inventors: Bruno Egner-Walter, Heilbronn; Eckhardt Schmid, Brackenheim, both of Fed. Rep. of Germany

[73] Assignee: ITT Industries, Inc., New York, N.Y.

[21] Appl. No.: 654,303

[22] Filed: Sep. 24, 1984

[30] Foreign Application Priority Data

Sep. 29, 1983 [DE] Fed. Rep. of Germany ....... 3335212

[51] Int. Cl.⁴ ................................................. B60S 1/40
[52] U.S. Cl. .................................................. 15/250.32
[58] Field of Search ...................... 15/250.32–250.42

[56] References Cited

U.S. PATENT DOCUMENTS

| 2,598,971 | 6/1952 | Carey | 15/250.32 |
| 3,576,044 | 4/1971 | Besnard | 15/250.32 |
| 4,179,767 | 12/1979 | Weiler | 15/250.32 |
| 4,445,249 | 5/1984 | Harbison et al. | 15/250.32 |

FOREIGN PATENT DOCUMENTS 123157  5/1971  United Kingdom ............. 15/250.32

Primary Examiner—Peter Feldman
Attorney, Agent, or Firm—Donald J. Lenkszus

[57] ABSTRACT

A windshield wiper has its wiper blade, in the longitudinal direction, held and guided relative to the wiper arm in several places. This prevents any undesired transverse and longitudinal play during the wiping motion.

17 Claims, 4 Drawing Figures

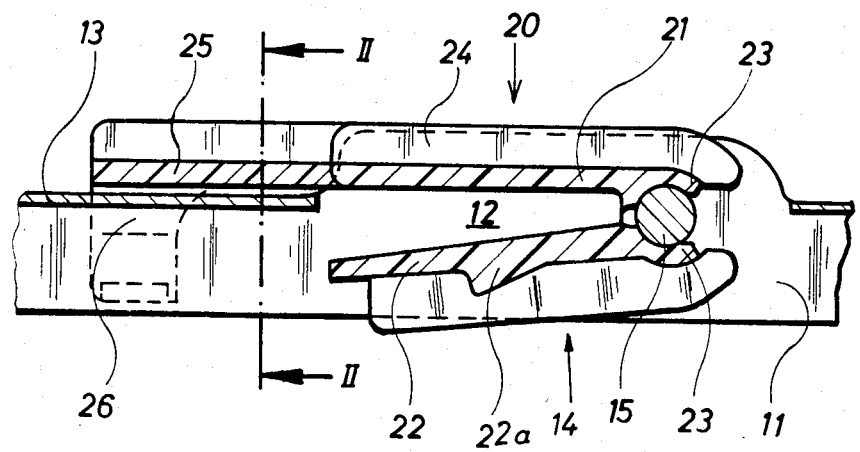
Fig. 1
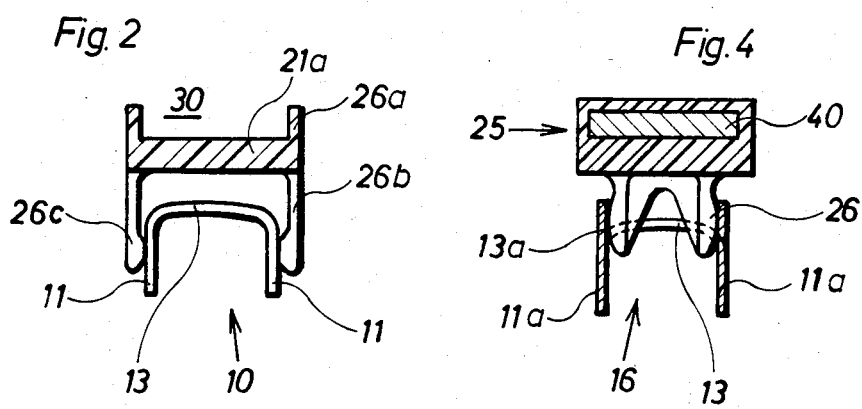
Fig. 2
Fig. 4

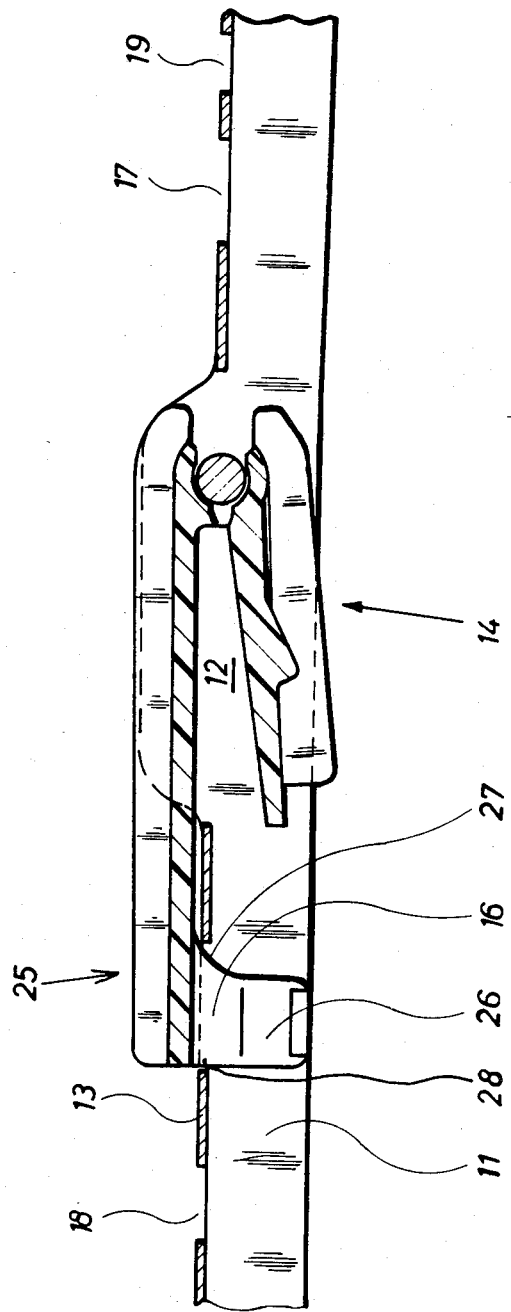

WINDSHIELD WIPER

BACKGROUND OF THE INVENTION

This invention pertains to a windshield wiper.

To achieve a proper wiping pattern it is necessary to articulate the wiper blade with the wiper arm in such a way that the wiper blade may be swivelled about an axis substantially parallel to the plane of the window pane and can thus adapt to different curvatures of the window pane. However, the wiper blade may not turn about an axis perpendicular to the swivelling axis and/or not be tilted about its longitudinal axis, because it would carry out undesired swings which result in rattling and in an unsteady wiping pattern.

German specification No. AS 25 15 388 suggests making the moving joint between wiper arm and wiper blade free from play to a substantial extent and thereby improving the lateral guidance of the parts relative to each other. In particular it has been suggested to articulate a wiper blade with the wiper arm by means of its bolt arranged in an aperture of the supporting yoke via a connecting member. This connecting member has flexible guide walls which may be deflected and which extend in the longitudinal direction of the wiper blade. The guide walls are pressed towards each other by the areas of the supporting yoke side walls limiting the aperture. Although a fitting seat of the connecting member in the supporting yoke is achieved thereby it is still possible that the wiper blade together with the connecting member can be undesiredly turned or tilted relative to the wiper arm. This is possible because the portion of the supporting yoke upon which the guide walls act is relatively small as compared with the overall length of the supporting yoke. Thus a windshield wiper of this kind does not have all desired properties.

SUMMARY OF THE INVENTION

It is therefore an object of the present invention to provide a windshield wiper with an improved guidance between wiper arm and wiper blade.

In accordance with the principles of the invention, a windshield wiper blade is guided relative to the wiper arm in several points distributed over its longitudinal extension. The quality of the guidance can be optimally adapted to each type of windshield wiper by an appropriate selection of the spacings between the points and their number. The larger the distance from the moving joint and thus from the axle about which the wiper blade could turn perpendicularly to the plane of the window pane the smaller must be the force to be exerted by the guide body to prevent this turning. The more guide bodies there are, the smaller must be the force exerted by a single guide body to prevent the undesired turning and tilting. A person skilled in the art can without difficulty, based on the teachings herein, determine the necessary and possible maximum number of points and the necessary and possible maximum spacing between them, when he knows the size and shape of the wiper blade supporting yoke and the shape of the wiper arm, so that this need not be discussed here.

By providing a guide body of resilient material, the guide body sits closely on one or both supporting yoke side walls. Many plastics materials used for connecting members have such a resiliency. In accordance with the invention, the two parts may be manufactured together from one material. The mounting of the guide body will be especially easy when it is formed on the connecting member.

Guide bodies are preferred which have several guide surfaces. The guide surfaces can thereby either be provided to rest against the outer surfaces and/or the inner surfaces of one or both side walls. The latter case can especially easily be achieved with the wiper blade known from the German German Pat. No. 28 43 249. For aerodynamics, the supporting yoke of this wiper blade is already provided with several apertures which, for production engineering purposes, reach as far as to the side walls. The shape of the guide body in this case, is less complicated than with narrower apertures. Here the guide surfaces in accordance with the invention would be arranged on the elongations of the guide body positioned below the web of the supporting yoke. As far as wiper blades without an additional aperture are concerned, elongations are provided on the guide body so that the guide surfaces rest against the inner surfaces of the side walls. These elongations engage into the supporting yoke from the longitudinal edges of the side walls not facing the web.

A wiper blade with several apertures of which at least one is penetrated by the guide body has a kind of hook connection. The edges of the web running transversely to the longitudinal direction of the wiper blade act as stops in case of an undesired longitudinal displacement of the wiper blade relative to the wiper arm end. These stops thus prevent a longitudinal displacement of the wiper blade relative to the wiper arm end. In an arrangement of this kind, the connecting member, without any danger, can even have a recess for the articulating member of the wiper arm if the wiper arm is to be extendible. Seen from the wiper arm end, this recess is mouth-shaped and open to the front or to the bottom. Otherwise it is possible that in windshield wipers of this kind the wiper element of the wiper blade, which wiper element is mostly made of rubber and which rests against the window pane to be cleaned, due to the friction between itself and the window pane forms such a resistance to extending and drawing-in that the wiper blade is displaced along the wiper arm end and detached from it. Thus the invention prevents an undesired longitudinal play even in complicated cases of application.

For quite some time, connecting members have worked well which have lateral, resilient guide walls limiting a receiving channel for the wiper arm. In accordance with the invention, it is suggested to form the guide body with two lateral elongations on the guide walls. Then a large guide surface can be achieved on both sides of the supporting yoke.

Even better guidance can be achieved in that the supporting yoke is higher in the area of the guide body than in the other areas. This can be realized by cutting open the web in transverse and longitudinal direction and by folding down the areas cut open.

When the connecting member has two shanks which may be resiliently deflected relative to each other and which shanks are connected by a mouth-shaped recess, the joint connection between wiper blade and connecting member can be easily effected by slipping on the mouth of the conductor.

If the connecting member has two shanks and guide bodies formed on the guide walls, alternative kinds of fastening the guide walls can be employed. If the guide walls are connected with the shank also in the area of the elongations, which elongations lengthen the shank, the guide body is effectively a resilient cap or sleeve which may be deformed and which acts upon the supporting yoke from three sides. If, in contrast thereto, the guide walls are cut from the shank in the area of the elongations there are obtained two wings free on one end, which wings may be resiliently deflected and which rests against two sides of the supporting yoke. It is an advantage of the first alternative that the receiving channel for the wiper arm is longer, so that it is guided over a greater length. Thus with even a greater certainty a windshield wiper of this kind is not subjected to a detrimental transverse play.

The invention can be advantageously used both with wiper arms having a hook-shaped end and with wiper arms having a straight-lined end. In the latter case the guide body, if required together with the connecting member, can be especially easily secured on the wiper arm by injection-moulding, if a plastics material capable of being injection-moulded is used.

BRIEF DESCRIPTION OF THE DRAWINGS

The invention will be better understood from a reading of the following detailed description in conjunction with the drawings, in which:

FIG. 1 is a longitudinal section through the center area of a wiper blade;

FIG. 2 is a section taken on the line II—II of FIG. 1;

FIG. 3 is a longitudinal section through the center area of another wiper blade; and FIG. 4 is a section through a further wiper blade.

DETAILED DESCRIPTION

The wiper blade according to FIGS. 1 and 2 has a supporting yoke 10 with a U-shaped cross-section. The supporting yoke has two side walls 11 and a web 13 connecting the side walls 11. In the center area of the wiper blade, the web 13 is removed, so that the supporting yoke 10 has an aperture 14. Thus in the area of the aperture 14 the supporting yoke has only the side wall areas 12, on which is riveted a cylindrical link 15. The wiper arm, not shown in the drawing, which has a hook-shaped end, can be articulated on the link 15 by means of a locking spring 20 of a resilient plastics material. The locking spring serves as a connecting member in the embodiment shown. The locking spring 20 has a U-shaped longitudinal section and two shanks 21, 22 which may be resiliently deflected relative to each other. The shanks are connected at their front ends by a mouth-shaped recess 23 which is open on one side. The recess 23 encompasses the connecting bolt 15 over approximately half of the perimeter of its generated surface. The lower shank 22 has a detent 22a by means of which it can engage in an aperture in the hook-shaped wiper arm end. Guide walls 24 are formed on the locking spring 20, extend along the lateral edges of both shanks 21, 22 and together with the shanks 21, 22, form a receiving channel 30 for the wiper arm.

The locking spring 20 with a guide body 25 formed on it extends in the longitudinal direction of the wiper blade beyond the aperture 14. The guide body 25 includes a portion 21a positioned in the extension of the guide walls 24 and two elongations acting as spring lugs 26. The elongations are approximately as high as the side walls 11. With their upper area 26a the spring lugs 26, together with the portion 21, form a lengthening of the receiving channel 30 for the wiper arm. The two spring lugs 26, include areas 26b which extend downwards, are thickened at their lower end 26c and in unmounted condition, are spaced apart by a distance which is smaller than the spacing of the side walls 11 of the supporting yoke. This is why the spring lugs 26 rest resiliently against the outer surfaces of the side walls 11 of the supporting yoke 10 when mounted. The extension 21a of the shank 21 together with the ends 26b and 26c of the elongations form resilient cap which may be deformed and which fittingly encompasses the supporting yoke 10.

In addition to the aperture 14 in the web 13, the wiper blade according to FIG. 3 has further apertures 16, 17, 18, 19 for aerodynamics. The locking spring 20 serving as a connecting member engages in the aperture 16 in the manner of a hook by means of the downwards extending areas of the elongations acting as spring lugs 26. Thus the spring lugs rest against the inner surface of the side walls 11 of the supporting yoke here. Expressed in a different way, the end 25 which may be resiliently deformed is fittingly clamped in the aperture 16 of the supporting yoke. If, during the wiping motion of a windshield wiper equipped with a wiper blade of this kind, strong forces appear in the longitudinal direction, the areas 27 and 28 of the spring lugs 26 act as a stop to prevent the wiper blade from the moving along a longitudinal direction relative to the wiper arm.

The supporting yoke side walls 11 of the wiper blade according to FIG. 4 are higher in the area of the aperture 16 than in the other areas. In this case the aperture 16 has been made by two cuts in the web 13 in the transverse direction and one cut along the center line of the web 13 and a folding upwards of the lugs 13a created by the cuts. Thus the lugs 13a are positioned in the perpendicular lengthening of the side wall areas 11a. The locking spring 20 is injection-moulded on the straight end of a wiper arm. The locking spring 20 serving as a connecting member has elongations which act as spring lugs 26 and rest against the inner surfaces of the supporting yoke areas 11a and 13a with their surfaces being effective as guide surfaces and not facing each other. Because the outer width of the locking spring 20 in the area of the spring lugs 26 is slightly smaller than the inner width of the aperture 16 the locking spring can immerge in the aperture 16 by means of its end 25 in the manner of a hook and secure the wiper blade reliably. The embodiment shown here has the advantage that the spring lugs 26 can be relatively high, so that the guide surfaces for the wiper blade are large. During the wiping motion, the wiper blade can nevertheless adapt to differing curvatures of the window pane. The locking spring 20 with its end 25 slides a little bit out of the aperture 16. It is shown in this position in FIG. 4.

Although the drawing only shows embodiments with several spring lugs 26 arranged in the transverse direction to one another, the use of several spring lugs 26 arranged one behind the other in the longitudinal direction entail further advantages. These spring lugs of the wiper blade shown in FIG. 3 would then engage in the aperture 18 and in the apertures not shown and lying to the left of this aperture 18.

As has been illustrated above, the wiper blade is excellently held and guided by the connecting member in all cases described. Thus a windshield wiper of this kind is free from an undesired longitudinal and transverse play during the wiper motion even if the wiper motion is composed of transverse, longitudinal and radial motions.

What is claimed is:

1. A windshield wiper, comprising:
   a wiper arm;
   an oblong supporting yoke for guiding a wiper rubber, said supporting yoke having at least a substantially U-shaped cross section with two side walls extending in the longitudinal direction of the wiper blade and being connected by a web, said web having an aperture;
   a link extending between said side walls in the area of said aperture;
   a connecting member connected with the free end of said wiper arm and articulated to said link;
   at least one guide body integrally formed with said connecting member and spaced apart from said aperture;
   said guide body fittingly resting against at least one side wall of said two side walls of said supporting yoke;
   said connecting member having first and second shanks which may be resiliently deflected relative to each other and having a mouth-shaped recess connecting one end of said first and second shanks and open on one side, said recess encompassing said link.

2. A windshield wiper according to claim 1, wherein:
   said guide body resiliently rests against said at least one side wall with at least one guide surface.

3. A windshield wiper according to claim 2, wherein:
   said guide body is made of a flexible plastics material resistant to wear.

4. A windshield wiper according to claim 3, wherein:
   said guide body clips on said wiper arm.

5. A windshield wiper according to claim 4, wherein:
   said guide body includes lateral elongations having two guide surfaces, said elongations being formed on lateral, resilient guide walls of said connecting member, said guide walls limiting a receiving channel for said wiper arm.

6. A windshield wiper according to claim 5, wherein:
   said elongations are formed as spring lugs traverse to the longitudinal direction of said supporting yoke and of said wiper arm.

7. A windshield wiper according to claim 1, wherein:
   said supporting yoke has at least one further aperture in which a guide body engages.

8. A windshield wiper according to claim 7, wherein:
   said further aperture extends in said web as far as to said two side walls.

9. A windshield wiper according to claim 6, wherein:
   said elongations rest against the surfaces of said two side walls.

10. A windshield wiper according claim 1, wherein:
    said guide body rests against the outer surface of at least one of said two side walls.

11. A windshield wiper according to claim 10, wherein:
    the areas of said side walls which rest against said guide body have a greater height than the remaining areas of said side walls.

12. A windshield wiper according to claim 5, wherein:
    said mouth-shaped recess encompasses said link over about half of the circumference of its generated surface, said link being substantially cylindrical.

13. A windshield wiper according to claim 9, wherein:
    said connecting member has two shanks which may be resiliently deflected relative to each other, and said shanks are connected by a mouth-shaped recess which encompasses said link over about half of the circumference of its generated surface, said link being substantially cylindrical.

14. A windshield wiper according to claim 12, wherein:
    said guide walls are connected by one of said two shanks.

15. A windshield wiper according to claim 12, wherein:
    said guide walls are cut from one of said two shanks in the area of said elongations.

16. A windshield wiper according to claim 12, wherein:
    said wiper arm terminates in a hook with two shanks connected by a curved portion, said two shanks of said connecting member having their outer surfaces fittingly positioned between said two shanks of said wiper arm hook, and one of said connecting member two shanks is locked with one of said two shanks of said wiper arm hook.

17. A windshield wiper according to claim 3, wherein:
    said wiper arm is injection-moulded with said connecting member.

* * * * *